United States Patent Office 3,493,629
Patented Feb. 3, 1970

3,493,629
FLUOROCARBON POLYMERS
Ronald A. Mitsch, St. Paul, and Paul H. Ogden, Oakdale Township, Washington County, Minn., assignors to Minnesota Mining and Manufacturing Company, St. Paul, Minn., a corporation of Delaware
No Drawing. Filed Oct. 28, 1966, Ser. No. 590,206
Int. Cl. C08f *3/24;* C08g *33/00*
U.S. Cl. 260—823                         7 Claims

ABSTRACT OF THE DISCLOSURE

A living polymer comprising recurring units of the formula —($CF_2$)— forming a polymer chain, one end of the chain having an inactive terminal group and consisting of a fragment of a boron trifluoride catalyst attached to a —$CF_2$— group, and the other end of the chain having an active terminal group consisting of the remainder of the boron trifluoride catalyst attached to a —$CF_2$— group. The activity of the active terminal group is characterized by the polymer's capability to resume its growth at the active terminal group upon the addition of difluorodiazirine.

---

This invention relates to novel fluorinated polymeric materials which possess "living polymer" properties. In particular, this invention relates to polymers containing recurring units of difluoromethylene and a process for their preparation.

As referred to hereinafter in the description of this invention, the term "living polymer" refers to polymeric species endowed with active ends or terminal groups which, under certain conditions, may resume their growth upon the addition of monomer or other reactive materials.

Accordingly, the polymeric molecules of this invention behave as active catalysts in the polymerization of further quantities of monomer to produce polymers of increased molecular weight. In certain instances these novel materials also provide catalytic effect of other monomers, or react with other polymers, to produce copolymers.

Living polyhydrocarbons have been previously recorded, see, e.g. Szwarc, M., Nature, 178, 1168 (1956), and Svensk. Kemish. Tidskrift, 76, 5:243 (1964); however, so far as is known, no polyfluorocarbons possessing living properties have heretofore been disclosed. Bawn, C. E. H., et al. have described the preparation of living polymethylene of the formula $$F_2B—CH_2—(CH_2)_n—CH_2F$$

in J. Poly. Sci., 34, 93 (1959). The reaction described therein involves the polymerization of diazoalkanes in the presence of Lewis acids. The chains grow by repeated coordination of charged monomer to an active or "living" terminal group of the polymer. It is important to note that the polymerization of diazomethane described in the above-cited reference proceeds most satisfactorily at low temperatures. The general rule appears to be that the molecular weight of product increases with a decrease in reaction temperature.

In diametrical contrast to the vigorous reaction which occurs when diazomethane and a Lewis acid are combined, even at low temperatures, the present inventors have observed that a fluorinated diazirine such as

and a Lewis acid (e.g. boron trifluoride) do not react at similarly low temperatures. Surprisingly, however, it has been discovered that when exposed to the effect of ultraviolet light or heated to the point of pyrolysis, a mixture of difluorodiazirine,

and a Lewis acid, e.g. boron trifluoride, reacts to provide "living" polydifluoromethylene in substantial yield.

While it is to be understood that the inventors do not limit the present invention to an hypothesized mechanism, it appears that the reaction comprising this invention is dependent upon the formation of charged linear intermediates (e.g.

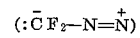

Such linear intermediates appear to occur only when difluorodiazirine,

undergoes photolysis or pyrolysis to produce a difluorocarbene radical and free nitrogen. Thus if the reaction

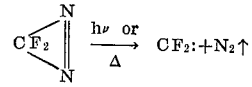

proceeds in two stages, hypothesized as follows:

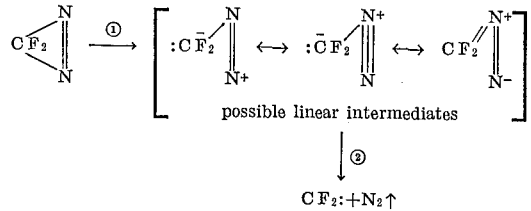

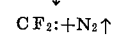

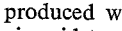

then a linear intermediate is produced which is capable of reacting with a suitable Lewis acid to produce the terminally active compound, $F_2B—CF_3$, which is in turn capable of growth upon the addition of more difluorodiazirine.

Assuming one of the said possible linear intermediates (e.g.,

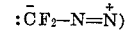

is present, the reaction mechanism theoretically involves the following three steps, using boron trifluoride as an example of a suitable Lewis acid:

(1) Coordination of

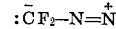

with the Lewis acid followed by spontaneous elimination of nitrogen:

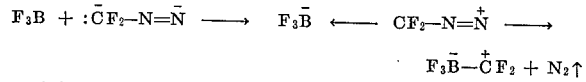

(2) Rearrangement of the resulting zwitterion:

(3) Polymerization then occurs by repeated coordination of the charged intermediate

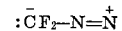

to the reactive site, namely, the boron atom:

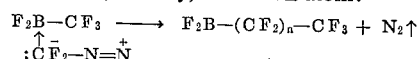
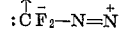

If a diazoalkane, e.g.,

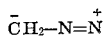

is also introduced into the system a "living" polymeric material containing both —CH$_2$— and —CF$_2$— groups is the result. The above three-step process continues until either all of the monomer compound has been used up or until chain termination occurs by transfer of a fluoride ion.

Previous studies on the photolytic decomposition of cyclic hydrocarbon diazirines by noted authorities in the field have indicated that the formation of charged linear intermediates in the mechanism in the case of hydrocarbons is highly unlikely and that said photolytic decomposition involves only the production of a carbene radical and free nitrogen, i.e.,

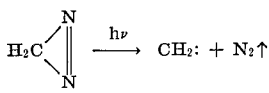

see, e.g., Frey, H. M., and Stevens, I. D. R., Proc. Chem. Soc., 79 (1962) and J. Chem. Soc., 3865 (1962). Furthermore, diazirines have not been reported to be capable of polymerization. Thus the polymerization of

in the presence of a Lewis acid under the influence of ultra-violet light or the heat of pyrolysis is highly unexpected.

The object of this invention, therefore, is the provision of novel "living" polyfluorocarbons, particularly polydifluoromethylene and polymers comprising both —CH$_2$— and —CF$_2$— groups. A further object of this invention is to provide a process for preparing said polyfluorocarbons which comprises photolyzing or pyrolyzing a mixture of difluorodiazirine,

and a Lewis acid. Other objects will become apparent from the following detailed description.

The novel polymeric material provided in practicing this invention is represented by the formula:

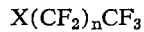

wherein X is a viable terminal group derived from a Lewis acid enabling said polymeric material to resume its growth at said viable terminal group upon the addition of difluorodiazirine under the influence of photolysis or pyrolysis, and $n$ is a number representing the average number of carbon atoms in the polymer chains.

Although the insolubility of the polymer obtained precludes accurate determination of molecular weight values, it has been observed that molecular weights are directly proportional to monomer concentration and inversely proportional to Lewis acid concentration and reaction temperature. The reaction conditions employed also have an effect on molecular weights. Thus the value of $n$ in the formula

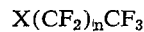

can be varied within broad limits by altering the ratio of Lewis acid to difluorodiazirine and by employing various different reaction conditions. Some indication of this variation is found by reference to the following table wherein the Lewis acid is boron trifluoride, in that when the products are liquids, $n$ is a relatively small number; where they are higher melting solids, $n$ may be 50 or more.

| Maleic BF$_3$ | Moles CF$_2$N$_2$ | Reaction Conditions | Polymer Properties |
|---|---|---|---|
| 1 | 10 | Photolysis at 25° C. in trichlorotrifluoroethane. | Melted with decomposition at 250° C. |
| 1 | 100 | ___do___ | Melted without decomposition at 230° C. |
| 1 | 1,000 | ___do___ | Melted without decomposition at 300° C. |
| 1 | 10 | Photolysis at 25° C. in methylene chloride. | A mixture of a yellow oil and a white solid. |
| 1 | 10 | Photolysis at 25° C. in vapor phase. | Mixture of yellow solid and yellow oil. |

The catalytic activity of the particular Lewis acid employed should depend on its ability to behave as an electron acceptor species for the charged linear intermediate,

However, because difluorodiazirine acts as a fluorinating agent under the conditions employed in practicing this invention, it is preferred that a Lewis acid be selected which is not susceptible to fluorination. Several Lewis acids will undergo replacement in the presence of difluorodiazirine (e.g., BCl$_3$ to BF$_3$) and although the resulting fluorinated Lewis acid will catalyze the desired polymerization reaction, a corresponding amount of diazirine will have been expended uselessly in the replacement side-reaction. Thus the preferred Lewis acids are those which are not susceptible to fluorination such as boron trifluoride.

The process of this invention can be carried out conveniently in the vapor phase or in a solvent. Suitable solvents are those which are inert to difluorodiazirine and the Lewis acid employed, with which they must also be compatible. They should not absorb ultraviolet light of wavelength between about 3000 A. and 3600 A. Halocarbons generally have been found to be the most suitable, particularly fluorocarbon solvents such as trichlorotrifluoroethane; however, non-fluorinated solvents such as carbon tetrachloride, chloroform, methylene chloride, etc., also have been found to be satisfactory.

The polymerization reaction is readily effected by mixing a catalytic amount of a suitable Lewis acid with difluorodiazirine, either in the presence of a compatible solvent, or in the vapor phase, and exposing the mixture to ultraviolet light or pyrolytic heat. If photolysis is to be employed the useful wavelengths of ultraviolet light may vary between about 3000 A. and 3600 A. Such actinic light can be conveniently obtained from most commercially available ultraviolet light sources. The most favorable results are obtained when a powerful source such as a General Electric 1000 watt BH–6 lamp is utilized. When employing pyrolysis the temperature range within which polymerization will proceed with acceptable results is between about 110° C. and 170° C. The most favorable results are obtained at about 120° C.

The "living" properties of these polymers are demonstrated by their ability to catalyze either further polymerization of

to produce higher molecular weight polydifluoromethylene or to catalyze the polymerization of diazomethane to produce polymethylene containing some polydifluoromethylene, or copolymers, e.g., polymers with recurring units of the formula: —(CF$_2$)$_n$(CH$_2$)$_m$—, wherein $n$ and $m$ are numbers representing the average length of the carbon chains effecting the molecular weights of the polymers.

These "living" properties are retained even after the material has been maintained at high vacuum for several hours or has been melted and resolidified, thus discounting any possibility of entrapped Lewis acid causing the polymerization. The catalytic activity of these living polymers cannot be reduced by washing and is only removed completely by repeatedly melting the polymers preferably under an atmosphere of nitrogen.

In addition to their utility based on catalytic activity whereby the polymers of the invention can be employed to make block co-polymers, or to catalyze polymerization of e.g. diazoalkanes, the polymers of the invention can, when of relatively high molecular weight, be formed into desired configurations, as by sintering powdered polymer. Polymers of the invention of low molecular weight can be used as inert oils or greases, e.g. as lubricants in severe environments.

Various embodiments of this invention are illustrated by the following examples of certain preferred embodiments thereof. It will be understood, however, that the examples are included merely for purposes of illustration and are not intended to limit the scope of the invention.

EXAMPLE 1

Difluorodiazirine,

(0.35 g., 4.5 millimoles) and boron triffuoride, $BF_3$ (0.03 g., 0.45 millimole) were condensed into a Pyrex tube containing 10 ml. of trichlorotrifluoroethane and then photolyzed with ultraviolet light from a BH-6 lamp for 4 hours at room temperatrue. After removal of the volatile material, a yellow solid remained [0.14 g., i.e., 60 percent of theoretical yield for $(-CF_2-)_n$]. The infrared spectrum and X-ray powder photograph of this material were identical with those of polytetrafluoroethylene. The material melted with decomposition at 250° C.

*Analysis.*—C. 23.3; F, 73.0; $(CF_2)_n$ requires C, 24.02; F, 75.98.

EXAMPLE 2

Difluorodiazirine,

(0.35 g., 4.5 millimoles) was condensed into a Pyrex tube containing 20 ml. of trichlorotrifluoroethane and a trace of the polymer described in Example 1, and irradiated with ultraviolet light from a BH-6 lamp for 4 days at room temperature. After removal of all volatile material a brown solid remained [0.134 g., 64 percent theoretical yield of $(-CF_2-)_n$], the infrared spectrum and X-ray powder photograph of which were identical with those of polytetrafluoroethylene. The material melted sharply at 300° C. and solidified at 285° C.

*Analysis.*—C, 23.98; F, 73.50; $(CF_2)_n$ requires C, 24.02; F, 75.98.

EXAMPLE 3

Difluorodiazirine (0.38 g., 4.9 millimoles) and boron trifluoride (0.03 g., 0.49 millimole) were condensed into a Pyrex tube containing 20 ml. of methylene chloride and then irradiated with ultraviolet light from a BH-6 lamp for 8 hours at room temperature. After removal of volatile material a mixture of yellow oil and white solid [0.0625 g., 26 percent of theoretical yield for $(-CF_2-)_n$] remained. The infrared spectrum of the white solid was identical with that of polytetrafluoroethylene.

EXAMPLE 4

Difluorodiazirine (0.382 g., 4.9 millimoles) and boron trifluoride (0.03 g., 0.45 millimole) were condensed into a 250 cc. gas bulb and irradiated for 4 hours at room temperature with ultraviolet light from a BH-6 lamp. After removal of the volatile material which consisted of a mixture of tetrafluoroethylene, boron trifluoride and nitrogen, a mixture of a brown oil and white solid remained [0.05 g., 20 percent of theoretical yield for $(-CF_2-)_n$] both of which were identified as polydifluoromethylene by their infrared spectra.

EXAMPLE 5

Difluorodiazirine (0.382 g., 4.9 millimoles and boron trifluoride (0.03 g., 0.49 millimoles) were condensed into a Pyrex tube and then heated together at 140° C. for one hour. After removal of the volatile material which was found to consist of tetrafluoroethylene, perfluorocyclopropane, perfluoro-2,3-diaza - 1,3 - butadiene, boron trifluoride and nitrogen, a white solid remained, M.P. 200–210° C. [0.045 g., 18 percent of theoretical yield for $(-CF_2-)_n$]. The infrared spectrum of the solid was identical with that of polytetrafluoroethylene.

*Analysis.*—C, 23.4; F, 74.4; $[(CF_2)_n$ requires C, 24.02; F, 75.98].

EXAMPLE 6

Example 5 was repeated using a 1:1 ratio of $CF_2N_2:BF_3$ and the yield of polymer was increased to 41 percent of theoretical for $(-CF_2-)_n$.

*Analysis.*—C, 22.9; F, 74.2; $[(CF_2)_n$ requires C, (24.02; F, 75.98].

EXAMPLE 7

Example 5 was repeated at 120° C. and the yield of polymer increased to 37.4 percent of theoretical for $(CF_2)_n$. The melting point of the product was 200–210° C.

EXAMPLE 8

Polymer from Example 1 was added to a solution of diazomethane in diethyl ether. Vigorous effervescence of nitrogen occurred and the solution was decolorized. The white solid which was filtered off was shown by its infrared spectrum to be a polymeric material containing both C—H and C—F bonds.

What is claimed is:

1. An insoluble polymer in liquid or solid from which comprises recurring units of the formula $-(CF_2)-$; forming a polymer chain, one end of said chain having an inactive terminal group and consisting of a fragment of a boron trifluoride catalyst attached to a $-CF_2-$ group, and the other end of said chain having an active terminal group consisting of the remainder of said boron trifluoride catalyst attached to a $-CF_2-$ group, the activity of said active terminal group characterized by said polymer's capability to resume its growth at said active terminal group upon the addition of difluorodiazirine.

2. A process for preparing an insoluble polymer in liquid or solid form which comprises recurring units of the formula $-(CF_2)-$, forming a polymer chain, one end of said chain having an inactive terminal group and consisting of a fragment of a boron trifluoride catalyst attached to a $-CF_2-$ group, and the other end of said chain having an active terminal group consisting of the remainder of said boron trifluoride catalyst attached to a $-CF_2-$ group, the activity of said active terminal group being characterized by said polymer's capability to resume its growth at said terminal group upon the addition of difluorodiazirine which process comprises photolyzing a mixture of difluorodiazirine and boron trifluoride in a solvent or the vapor phase.

3. The process according to claim 2 wherein the solvent is trichlorotrifluoroethane.

4. The process according to claim 2 wherein the solvent is methylene chloride.

5. A process for preparing an insoluble polymer in liquid or solid form which comprises recurring units of the formula $-(CF_2)-$, forming a polymer chain, one end of said chain having an inactive terminal group and consisting of a fragment of a boron trifluoride catalyst attached to a $-CF_2-$ group, and the other end of said chain having an active terminal group consisting of the remainder of said boron trifluoride catalyst attached to a —$CF_2$— group, the activity of said active terminal group being characterized by said polymer's capability to resume its growth at said active terminal group upon the addition of difluorodiazirine which process comprises pyrolyzing a mixture of difluorodiazirine and boron trifluoride in a solvent or in the vapor phase.

6. The process according to claim 2 which comprises photolyzing a mixture of difluorodiazirine and boron trifluoride in the vapor phase.

7. A process for preparing copolymers of polyhydrocarbons and polyfluorocarbons which comprises bringing together an insoluble polymer in liquid or solid form which comprises recurring units of the formula —($CF_2$)—, forming a polymer chain, one end of said chain having an inactive terminal group and consisting of a fragment of a boron trifluoride catalyst attached to a —$CF_2$— group, and the other end of said chain having an active terminal group consisting of the remainder of said boron trifluoride catalyst attached to a —$CF_2$— group, the activity of said active terminal group being characterized by said polymer's capability to resume its growth at said active terminal group upon the addition of difluorodiazirine, and a diazoalkane.

References Cited

UNITED STATES PATENTS

| 2,230,654 | 2/1941 | Plunkett | 260—92.1 |
| 2,670,333 | 2/1954 | Ray | 260—2 |
| 2,786,827 | 3/1957 | Barnhart | 260—92.1 |
| 2,938,889 | 5/1960 | Krespan | 260—92.1 |
| 3,054,785 | 9/1962 | Wade | 260—92.1 |
| 3,272,786 | 9/1966 | Perry | 260—92.1 |
| 3,257,381 | 6/1966 | Meyers | 260—239 |

FOREIGN PATENTS

| 877,961 | 9/1961 | Great Britain. |

OTHER REFERENCES

Bawn et al., "Jour. Polymer Science," vol. 34 (1959), pp. 93–108.

Mitsch et al., "Jour. of Heterocyclic Chemistry," vol. 2, June 1965, pp. 152–156.

Lagowski et al., 54 Chem. Abstracts 8603–4 (1960).

Parsons et al., 64 Chem. Abstracts 6674 (1966).

SAMUEL H. BLECH, Primary Examiner

U.S. Cl. X.R.

260—2, 239, 653.1, 92.1, 543; 204—159.11; 252—49.6

PO-1050
(5/69)

UNITED STATES PATENT OFFICE
CERTIFICATE OF CORRECTION

Patent No. 3,493,629        Dated February 3, 1970

Inventor(s) Ronald A. Mitsch and Paul H. Ogden

It is certified that error appears in the above-identified patent and that said Letters Patent are hereby corrected as shown below:

Column 1, line 41, "of" should read --for--. Column 4, line 1, "Maleic" should read --Moles--. Column 6, line 40, "from" should read --form--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents